J. W. ROBINSON & F. L. DOUGLAS.
TRIPLE VALVE FOR FLUID PRESSURE BRAKES.
APPLICATION FILED MAR. 28, 1911.

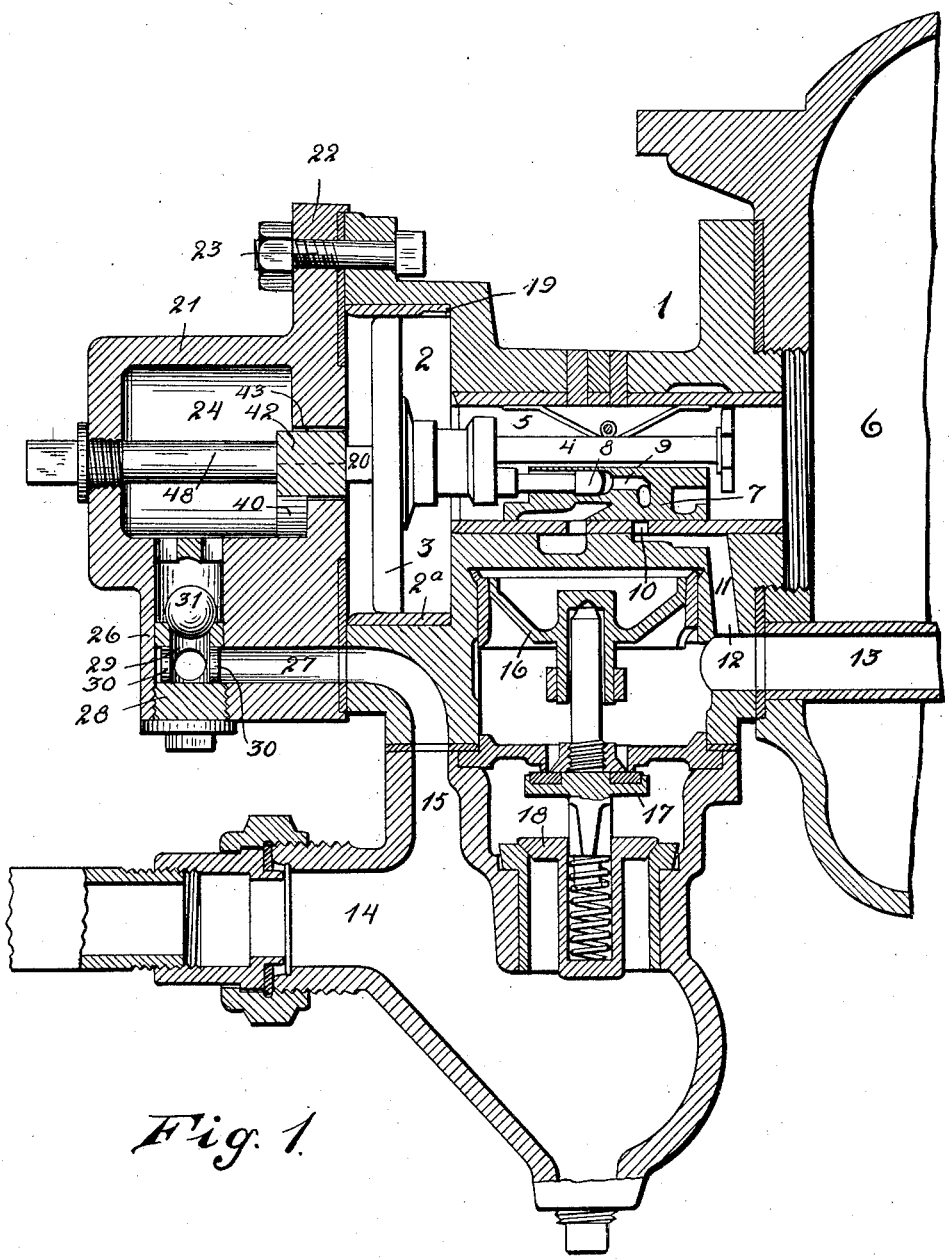

1,005,314.

Patented Oct. 10, 1911.

3 SHEETS—SHEET 2.

Witnesses

Inventors
John W. Robinson
Frank L. Douglas
By
Attorney

J. W. ROBINSON & F. L. DOUGLAS.
TRIPLE VALVE FOR FLUID PRESSURE BRAKES.
APPLICATION FILED MAR. 28, 1911.
1,005,314.
Patented Oct. 10, 1911.
3 SHEETS—SHEET 3.
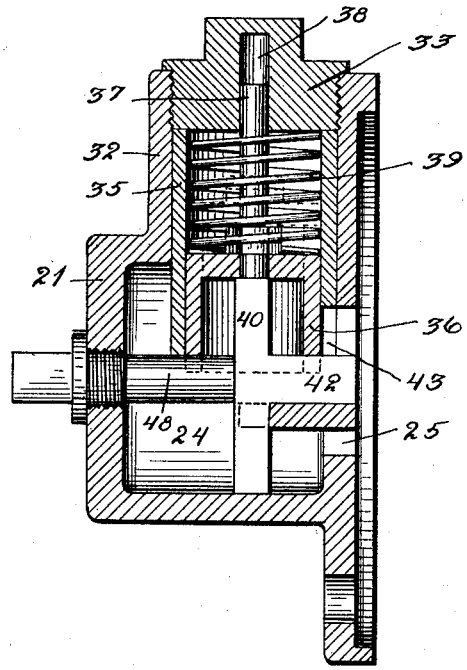
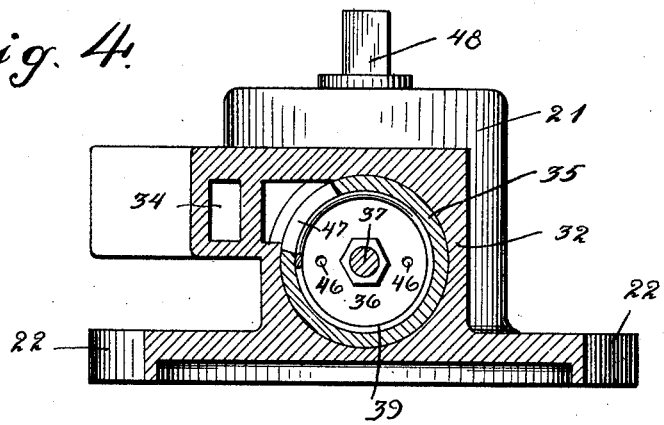

UNITED STATES PATENT OFFICE.

JOHN W. ROBINSON, OF YOAKUM, AND FRANK L. DOUGLAS, OF ROCKPORT, TEXAS.

TRIPLE VALVE FOR FLUID-PRESSURE BRAKES.

1,005,314. Specification of Letters Patent. Patented Oct. 10, 1911.

Application filed March 28, 1911. Serial No. 617,363.

*To all whom it may concern:*

Be it known that we, JOHN W. ROBINSON, residing at Yoakum, in the county of Lavaca and State of Texas, and FRANK L. DOUGLAS, residing at Rockport, in the county of Aransas and State of Texas, citizens of the United States, have invented certain new and useful Improvements in Triple Valves for Fluid-Pressure Brakes, of which the following is a specification.

Our invention relates to the triple valves used in fluid pressure brakes and has for its object the provision of means to prevent an undesirable quick action or emergency application of the brakes when a service reduction of pressure is made in the train pipe.

In the triple valve as at present constructed the movement of the triple piston is controlled by a stem held in position to stop the piston in position for a service application of the brakes by means of a coil spring mounted on the stem. This spring has sufficient tensile strength to hold the triple valve in service position under gradual reduction of the train pipe pressure, but is not sufficiently strong to hold the piston when the train pipe pressure is suddenly reduced and the pressure behind the piston in the auxiliary reservoir moves the piston rapidly and an emergency application of the brakes results.

It sometimes occurs that a defect in the valve mechanism such as a broken graduating stem, a weak or broken graduating spring, a dirty or gummed triple valve, defective graduating valve, a stopped up service port in the triple slide valve, or a leakage in the cylinder cap gasket, causes an emergency application of the brakes when only a service reduction of pressure is being made in the train pipe.

In our invention the means for controlling the action of the triple piston consists in the substitution of a stop for the piston that is moved transversely of the axis of the triple piston valve stem and positively controlled by the pressure in the train pipe for the longitudinally movable spring controlled stem now in use.

Figure 5:
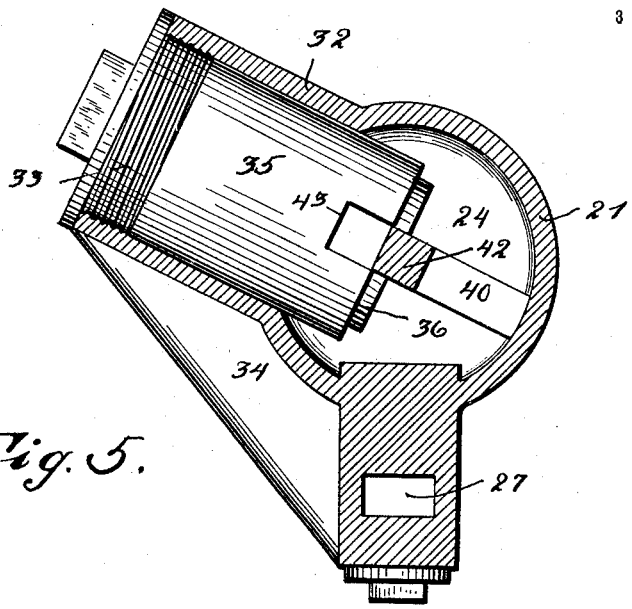
Figure 2:
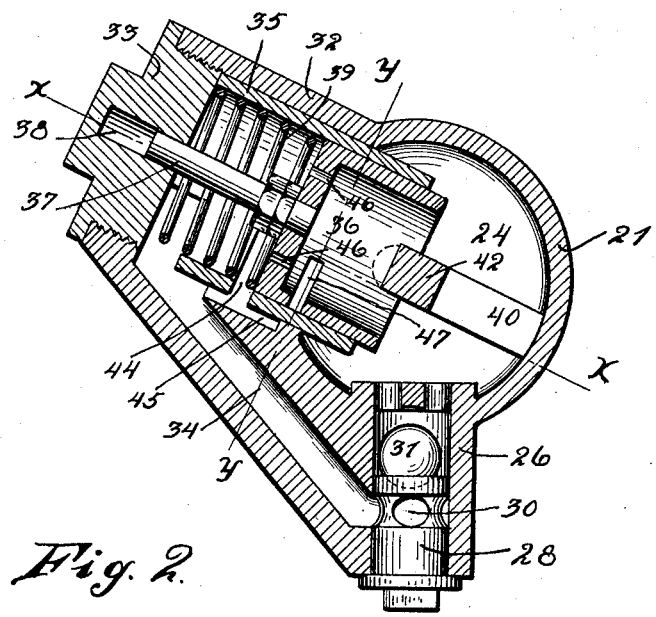

Our invention will be described in detail hereinafter and illustrated in the accompanying drawings in which:

Figure 1 is a sectional view of a triple valve showing our improvements in position thereon, Fig. 2, a transverse sectional view of the controller valve casing, Fig. 3, a section on the line X—X of Fig. 2, Fig. 4, a section on the line Y—Y of Fig. 2, and Fig. 5, a sectional view of the casing showing the controlling valve in elevation.

In the drawings similar reference characters will indicate corresponding parts in all of the views.

1 indicates the casing of a triple valve, of conventional form, having the cylinder 2 in which is slidably mounted the piston 3 having its stem 4 extending into the connection 5 between cylinder 2 and auxiliary reservoir 6.

7 indicates the slide valve controlled by the movement of piston 3 and 8 the graduating valve secured to the stem to control the passage of air through port 9 from the auxiliary reservoir to the brake cylinder (not shown), through port 10, by-pass 11 and outlet port 12, into auxiliary tube 13, in service applications of the brake.

14 indicates the train pipe connection, 15 the passage leading from the connection to the controller to be hereinafter described, 16 the emergency piston for actuating the emergency valve 17, and 18 the check valve of the construction ordinarily employed in these devices.

19 indicates the feed groove in the bushing 2$^a$ of cylinder 2 through which the equality of pressure in the auxiliary reservoir and train pipe is maintained.

20 indicates a knob on the piston 3.

The triple valve as ordinarily constructed has a spring actuated stem that engages knob 20 and limits the movement of triple piston 3 in an ordinary service operation of the brakes, caused by a gradual reduction of the pressure in the train pipe connection 14, 15. When the train pipe pressure is quickly relieved so as to cause an emergency application of the brakes the stem for controlling the movement of the triple piston is moved back against the resistance of the spring actuating it by the air pressure from the auxiliary reservoir behind the piston and a quick action of the brakes results.

The objection to the triple valve in common use is that should the spring actuating the stem, referred to above, be broken or weakened by use, or the stem itself broken so that there would be nothing to stop the movement of the valve piston it would move to emergency position upon a service reduction of pressure in the train pipe. Should the triple piston or the inside of the cylinder be dirty or gummed so that the piston could not move when the train pipe reduction is first made the piston will remain stationary until the train pipe pressure is reduced below the auxiliary reservoir pressure sufficiently to tear the piston loose. When this occurs the piston will travel rapidly to the other end of the cylinder and, if the pressure in the auxiliary reservoir is sufficient to overcome the train pipe pressure and the spring on the controlling stem, the piston will move to emergency position. Another cause of undesirable emergency actions of fluid pressure brakes is the failure of the graduating valve to operate either because it will not open or because its port has been stopped up with gum or dirt. As the pressure behind the triple piston is not relieved through the auxiliary tube the piston will be actuated into emergency position by the pressure in the auxiliary reservoir when strong enough to overcome the train pipe pressure combined with the pressure on the spring actuated stem.

Our invention has for its object the substitution of a transversely moving stop for the spring actuated stem in common use, said stop being always in position to limit the movement of the triple piston during a service reduction of pressure in the train pipe so that the piston cannot move into emergency position accidentally, said stop being moved to one side when an emergency action of the brakes is desired.

The preferred embodiment of our invention is shown in the drawings in which 21 indicates the controller casing having a base 22 secured to casing 1 by means of bolts or rivets 23, and a chamber 24 arranged centrally of said base 22 that communicates with cylinder 2 by means of a port 25 therein.

26 indicates a valve casing extending downwardly from chamber 24 with a port 27 therein extending through base 22 communicating with passage 15 leading to train pipe connection 14. 28 indicates a threaded valve support secured in casing 26 and having its upper end formed tubular as shown at 29 and with laterally extending openings 30 opposite port 27, the upper end of the support 28 being formed with a valve seat to receive a ball valve 31. The upper end of casing 26 communicates with chamber 24. 32 indicates another valve casing extending laterally from chamber 24 and closed by a threaded plug 33, and 34 a by-pass connecting valve casings 26 and 32. Mounted in valve casing 32 is a bushing 35 and slidably mounted in bushing 35 is a stop piston 36 having a stem 37 extending into socket 38 in plug 33 and actuated by means of a spring 39 engaging said plug 33 and the piston 36. On the rear side of piston 36 is a stop 40 which in its normal position engages the wall of chamber 24 opposite to casing 32 and has a laterally extending lug or projection 42 that extends through slot 43 in base 22 and, when the valve is in its normal position, is positioned to engage knob 20 on piston 3 to limit the movement of the piston to a service operation of the brakes.

44 indicates an opening in the side of bushing 35 and 45 a recess in the side of casing 32 connecting the by-pass 34 with opening 44. Stop piston 36 is formed with small holes 46 in the end thereof, and an opening 47 in its side wall to register with opening 44 at times.

48 indicates a pin mounted in the end of chamber 24 that engages the rear end 40 of the valve stem and serves to brace the lug or projection 42 when in its normal position.

In operation when charging the auxiliary reservoir 6 from the train pipe 14 the air enters valve casing 26 through port 27 and lifts valve 31 from its seat so that the air enters chamber 24 and proceeds from the chamber through port 25 into cylinder 2 and thence through feed groove 19 into connection 5 communicating with the auxiliary reservoir. At the same time the air will proceed through by-pass 34 into casing 32 and through openings 46 in piston 36 into chamber 24.

As soon as the pressure in the auxiliary reservoir is the same as the train pipe pressure valve 31 reseats by gravity and communication between chamber 24 and the train pipe is through openings 46, the by-pass 34 and port 27. In ordinary service reductions of pressure in the train pipe the openings 46 are sufficiently large to permit the air to flow from the chamber 24 to equalize the pressure in the chamber and train pipe, and the lug or projection 42 remains in position to prevent the piston 3 from moving farther than for a service application of the brakes. And this is true whether the piston 3 or the other parts of the valve work perfectly or not.

In case of an emergency application of the brakes being desired, however, the air will not flow through openings 46 rapidly enough to equalize the pressure on the two sides of the valve piston 36 and the pressure behind the piston 36 will move it outwardly against the resistance of spring 39 so that the lug on projection 42 is out of alinement with knob 20 on the piston 3 and it will move to the emergency position for setting the brakes quickly.

Having thus described our invention what we claim is:—

1. In a fluid pressure brake, the combination with a triple valve piston, of a lug or projection adapted to directly engage the piston to prevent it going to "emergency" position during a "service" reduction of pressure, said lug or projection movable transversely of the path of travel of the piston.

2. In a fluid pressure brake, the combination with a triple valve piston, a controller comprising a valve movable transversely of the path of movement of the triple valve piston, and a stem on said valve provided with a lug adapted to directly engage the triple valve piston to prevent it going to "emergency" position during a "service" reduction of pressure.

3. A triple valve device comprising a valve and piston having a "release" position, an intermediate "service" position, and an "emergency" position, and means engaging said piston and movable transversely of its path of travel to positively limit the movement thereof and prevent it from going to "emergency" position during "service" reductions in train pipe pressure.

4. A triple valve device comprising a valve and piston having a "release" position, an intermediate "service" position, and an "emergency" position, means engaging said piston and movable transversely of its path of travel to positively limit the movement thereof and prevent it from going to "emergency" position during "service" reductions in train pipe pressure, and means operated by a sudden reduction in train pipe pressure for withdrawing said limiting means.

5. In a fluid pressure brake, the combination with a triple valve piston, a controller comprising a chamber, a valve casing communicating with said chamber, a controller valve piston in the said casing and movable transversely with the path of movement of the triple valve piston, a lug or projection on said controller valve piston and positioned to engage the triple valve piston, said controller valve being provided with openings sufficiently large to equalize the pressure on the two sides of the piston during a service reduction of pressure but too small to equalize the pressure during emergency reductions of pressure.

6. In a fluid pressure brake, the combination with a triple valve piston, a controller comprising a chamber, a valve casing communicating with said chamber and with the train pipe, a controller valve piston in said casing and movable transversely with the path of movement of the triple valve piston, a stem secured to said piston and having a rearwardly extending portion with a transverse lug or projection adapted to engage the triple valve piston, said controller valve piston being provided with openings sufficiently large to equalize the pressure on its two sides during a service reduction of pressure but too small to equalize the pressure during emergency reductions of pressure.

7. In a fluid pressure brake, the combination with a triple valve piston, a controller comprising a chamber, a valve casing communicating with said chamber and with the train pipe, a check valve in said casing that closes automatically when the pressure in the chamber and train pipe is equal, another valve casing also communicating with said chamber, a controller valve piston slidably mounted in the last mentioned casing, a stem secured to said piston having a rearwardly extending portion with a transverse lug or projection adapted to engage the triple valve piston, said controller valve piston being provided with openings sufficiently large to equalize the pressure on the two sides thereof during service reductions in the train pipe and too small to equalize the pressure during emergency reductions of pressure, said piston being provided with a port for the release of pressure during an emergency reduction of pressure, and a by-pass connecting the two valve casings.

In testimony whereof we hereto affix our signatures in the presence of two witnesses.

JOHN W. ROBINSON.
FRANK L. DOUGLAS.

Witnesses:
G. A. ROQUEMORE,
FRED BENHAM.

---

Copies of this patent may be obtained for five cents each, by addressing the "Commissioner of Patents, Washington, D. C."